No. 643,947. Patented Feb. 20, 1900.
W. S. COX.
CREAM SEPARATOR.
(Application filed June 29, 1899.)
(No Model.)

Witnesses  
Inventor  
William S. Cox  
By  
Attorney

UNITED STATES PATENT OFFICE.

WILLIAM S. COX, OF ELYRIA, OHIO.

CREAM-SEPARATOR.

SPECIFICATION forming part of Letters Patent No. 643,947, dated February 20, 1900.

Application filed June 29, 1899. Serial No. 722,326. (No model.)

*To all whom it may concern:*

Be it known that I, WILLIAM S. COX, a citizen of the United States, residing at Elyria, in the county of Lorain and State of Ohio, have invented certain new and useful Improvements in Cream-Separators; and I do hereby declare the following to be a full, clear, and exact description of the invention, such as will enable others skilled in the art to which it appertains to make and use the same.

My invention relates to new and useful improvements in cream-separators; and it has for its object to provide a simple and cheap device of this character with which the rapid separation of the milk and cream will be accomplished and which will enable a perfect separation to be effected, whereby the largest possible percentage of cream will be obtained.

Other objects and advantages of my invention will become apparent in the course of the following description, and the points of novelty will be particularly pointed out in the claim.

The invention consists primarily in introducing atmospheric air below the surface of the milk in its natural state by the novel means illustrated in the accompanying drawings, in which—

Figure 1:
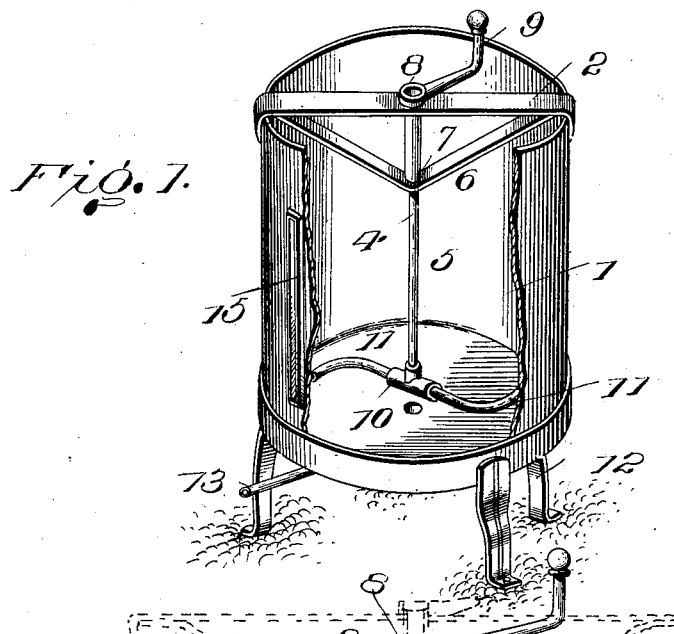
Figure 2:
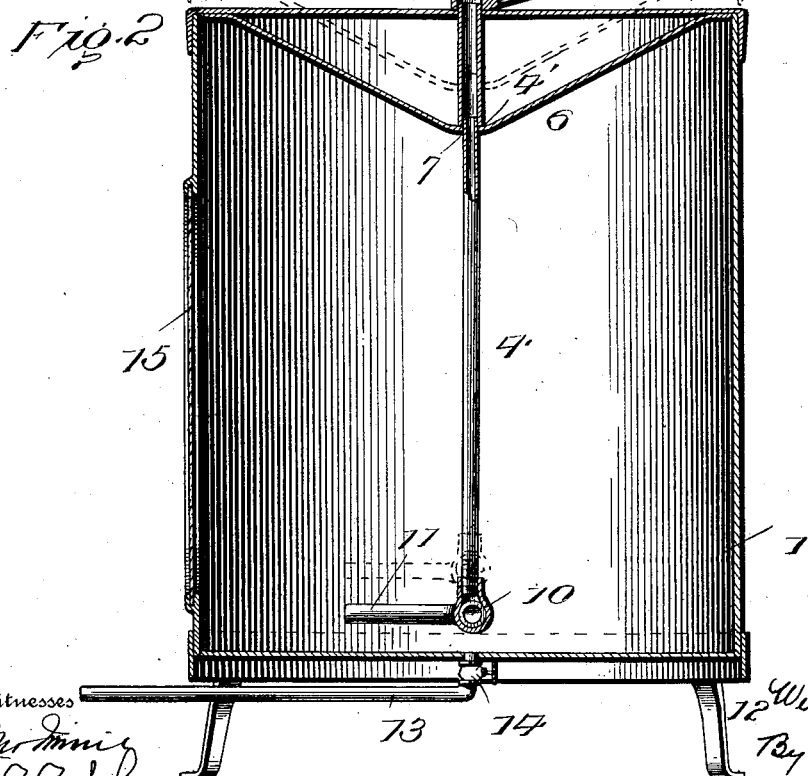

Figure 1 is a perspective view of my improved cream-separator, partly broken away, showing the inspirator. Fig. 2 is a vertical section of the same.

Referring to the drawings, the numeral 1 indicates a suitable receptacle, preferably of tin and cylindrical in form, across the top of which, in carrying out my invention, I provide a removable brace 2, which is provided at its center with a circular opening, through which passes the vertical hollow arm 4 of the inspirator 5.

The numeral 6 designates a second angle-brace, which is secured at its ends to the brace 2 by solder or other convenient means and is provided at its lowest point with a circular opening 7 for the passage of the arm 4, which brace 6, in conjunction with the brace 2, serves to form a bearing 4' and support for the arm 4.

The vertical arm 4 is embraced at its upper end by a collar 8, provided with a crank-arm 9, the object of which will be hereinafter described.

The numeral 10 designates a T-joint, which has its arms internally screw-threaded for the reception of the vertical arm 4 and the screw-threaded ends of two oppositely-curved hollow arms 11, which have their ends open and communicate through the T-joint with the opening in the arm 4.

The bottom of the receptacle 1 is raised a sufficient distance above its support by short legs 12, which permit of the provision of a pipe 13, which opens at its inner end into the receptacle for the obvious purpose of drawing off the milk and cream successively. Said pipe is provided near the bottom of the receptacle with a stop-cock 14, by which means the pipe can be closed after the milk has been drawn off for a sufficient time to permit of a separate receptacle being placed under the mouth of the pipe to contain the cream, which is drawn off by again opening the stop-cock.

In order that the operator may be enabled to see the condition of the contents of the receptacle, I provide a narrow glass window 15 in the side of the receptacle in the usual manner.

The operation of my improved separator is as follows: A sufficient quantity of cold water is added to the milk in its natural state to produce the desired temperature when the crank is turned to the right, thus causing the revolution of the hollow arm 4 and the horizontal curved arms 11, which will obviously produce vacuums adjacent to the open ends of the horizontal arms, which will cause the atmospheric air to be drawn through the hollow arm 4 and the arms 11 and liberated into the milk, which air will of course rise through the milk, causing the rapid separation of the cream therefrom and carrying with it objectionable odors and impurities contained therein. After the inspirator has been in use for about half a minute or so the same is removed and the contents of the receptacle allowed to stand for about half an hour, when the cream will be found to have been separated from the milk.

What I claim, and desire to secure by Letters Patent, is—

In a cream-separator the combination with a suitable receptacle, of a transverse detachable bracket formed with downturned arms adapted to embrace the upper edge of the receptacle and having an opening in the central portion thereof, a V-shaped brace secured to the under side of said bracket and extending down into the interior of the receptacle and having an opening in line with the opening of the transverse bracket, of smaller diameter than the hole in the last-mentioned bracket, a short tubular shaft extending through the hole in the transverse bracket and having its lower end resting on the upper side of the V-shaped bracket, and a second smaller tubular shaft extending through the hole in the V-shaped bracket and secured to the lower end of the short shaft in such a way that a shoulder will be formed to limit the downward movement of the tubular shafts, said smaller shaft being provided at its lower end with oppositely-curved horizontal tubular arms communicating with the last-mentioned vertical arm, whereby air will be drawn into the milk when the tubes and arms are rotated, and means of rotating the same, substantially as described.

In testimony whereof I affix my signature in the presence of two witnesses.

WILLIAM S. COX.

Witnesses:
J. L. REED,
J. E. WILLARD.